United States Patent
Kawasaki et al.

(10) Patent No.: US 8,744,743 B2
(45) Date of Patent: Jun. 3, 2014

(54) FRONT STRUCTURE AND REAR STRUCTURE OF VEHICLE

(75) Inventors: Tomoya Kawasaki, Toyota (JP); Hitoshi Mitsumata, Toyota (JP); Takashi Kobiki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 44 days.

(21) Appl. No.: 13/123,677

(22) PCT Filed: Mar. 24, 2009

(86) PCT No.: PCT/JP2009/001288
§ 371 (c)(1),
(2), (4) Date: Apr. 11, 2011

(87) PCT Pub. No.: WO2010/109517
PCT Pub. Date: Sep. 30, 2010

(65) Prior Publication Data
US 2012/0007764 A1 Jan. 12, 2012

(51) Int. Cl.
*G06F 17/10* (2006.01)
(52) U.S. Cl.
USPC .......... 701/301; 293/119; 293/132; 180/68.1; 180/68.4; 180/68.2; 180/69.2
(58) Field of Classification Search
USPC ............. 180/274, 271, 69.2, 68.2, 68.4, 68.1; 280/735; 701/45, 301, 408, 1, 300, 96; 342/70, 173, 194; 340/905, 435; 293/119, 132; 188/371
See application file for complete search history.

(56) References Cited

U.S. PATENT DOCUMENTS

| | | | |
|---|---|---|---|
| 6,496,138 B1 | 12/2002 | Honma | |
| 2004/0011582 A1* | 1/2004 | Aoki | 180/274 |
| 2004/0020701 A1* | 2/2004 | Aoki | 180/274 |
| 2005/0023057 A1* | 2/2005 | Maeda et al. | 180/68.1 |
| 2006/0022866 A1* | 2/2006 | Walton et al. | 342/194 |
| 2006/0271296 A1 | 11/2006 | Takeichi et al. | |
| 2008/0309101 A1* | 12/2008 | Matsubara et al. | 293/119 |

(Continued)

FOREIGN PATENT DOCUMENTS

| | | |
|---|---|---|
| DE | 198 30 811 A1 | 9/1999 |
| DE | 10 2009 010 673 A1 | 9/2010 |

(Continued)

OTHER PUBLICATIONS

International Search Report in International Application No. PCT/JP2009/001288; dated Apr. 21, 2009 (with English-language translation).

*Primary Examiner* — Behrang Badii
(74) *Attorney, Agent, or Firm* — Oliff PLC

(57) ABSTRACT

Provided is a front structure of a vehicle wherein damage on auxiliary equipment by a millimeter-wave radar is limited at the time of collision, and cooling efficiency for auxiliary equipment using traveling wind is not reduced. A front structure of a vehicle comprises a front right side radar for detecting an obstacle on the front right side of a vehicle by transmitting/receiving a radio wave, a front left side radar for detecting an obstacle on the front left side of a vehicle by transmitting/receiving a radio wave, a bumper reinforcement, right and left crush boxes, and a condenser cooled by traveling wind, wherein the front right side radar is disposed on the outboard side of the right end of the condenser, and the front left side radar is disposed on the outboard side of the left end of the condenser.

6 Claims, 4 Drawing Sheets

(56) References Cited

U.S. PATENT DOCUMENTS

| | | | |
|---|---|---|---|
| 2009/0120912 A1* | 5/2009 | Schoepf et al. | 219/69.17 |
| 2010/0219649 A1 | 9/2010 | Schmidt et al. | |
| 2011/0032119 A1* | 2/2011 | Pfeiffer et al. | 340/905 |

FOREIGN PATENT DOCUMENTS

| | | |
|---|---|---|
| JP | A-06-168400 | 6/1994 |
| JP | A-11-160426 | 6/1999 |
| JP | A-11-231041 | 8/1999 |
| JP | A-2000-085497 | 3/2000 |
| JP | A-2003-240838 | 8/2003 |
| JP | A-2006-199203 | 8/2006 |
| JP | A-2006-317186 | 11/2006 |
| JP | A-2007-216803 | 8/2007 |
| JP | A-2008-137606 | 6/2008 |

* cited by examiner (PRIOR ART)

FRONT STRUCTURE AND REAR STRUCTURE OF VEHICLE

TECHNICAL FIELD

The present invention relates to a front structure and a rear structure, of a vehicle, including a radar for detecting obstacles, and more particularly, to a front structure and a rear structure, of a vehicle, including a plurality of radars for detecting obstacles to left and right sides of the vehicle.

BACKGROUND ART

Conventionally, in order to observe obstacles in front of, to left and right sides of, and behind a vehicle, radars, such as laser radars or millimeter-wave radars, are used. These millimeter-wave radars include a distance measurement function for measuring the distance from the vehicle to an obstacle by using a millimeter wave having a wavelength of 1 mm to 10 mm, and a very high frequency of 30 GHz to 300 GHz, or a speed measurement function for measuring a speed with respect to an obstacle. Moreover, examples of the intended use of the radars are for Pre-Crash Safety (PCS) or adaptive cruise control (ACC), which is a control system assisting warnings, displays, risk aversions, and the like.

FIG. 4 is a diagram showing an example of a conventional front structure 40 of a vehicle equipped with a millimeter-wave radar. (a) of FIG. 4 shows a bottom view of the front structure 40, and (b) of FIG. 4 shows a front view of the front structure 40.

The front structure 40 of the vehicle includes a front right side millimeter-wave radar 401a, a front left side millimeter-wave radar 401b, a bumper reinforcement 402, a condenser 403, crash boxes 404, and brake ducts 405.

In this front structure 40, for example, an impact energy in the event of collision from the front of the vehicle is dispersed by the bumper reinforcement 402 to front side members (not shown) at the left and the right. The dispersed energy is then efficiently absorbed by the front side members which are highly improved in yield strength by means of high tensile steel plates, or the like. Also, by providing the crash boxes 404 at joints between the bumper reinforcement 402 and the front side members, respectively, a collision energy in the event of a minor collision is absorbed by the crash boxes 404, thereby suppressing the deformation of the body.

The front right side millimeter-wave radar 401a and the front left side millimeter-wave radar 401b shown in FIG. 4 are secured on end portions, of the bumper reinforcement 402, at the left and the right, by using the bracket members 406, respectively.

Also, a radio-wave radar for vehicle is disclosed that realizes cost reduction, while maintaining the radar function, by reducing the number of components as well as improvement of the external design of the vehicle (e.g., see Patent Literature 1).

Patent Literature 1: Japanese Laid-Open Patent Publication No. 11-231041

DISCLOSURE OF THE INVENTION

Problems to be Solved by the Invention

However, in the conventional front structure 40 as shown in FIG. 4, the front right side millimeter-wave radar 401a and the front left side millimeter-wave radar 401b are arranged in areas near a cover part of the vehicle and in front of the condenser 403. Because of this, a problem occurs that, even in the event of a minor collision from a side of the vehicle, the front right side millimeter-wave radar 401a or the front left side millimeter-wave radar 401b is readily moved back, thereby ending up with damaging an auxiliary component, such as the condenser 403 or a radiator, or other pipes or the like.

Further, in this case, there is a problem that such an auxiliary component causes functional damage, such as liquid leakage, thereby making it difficult for the vehicle to run on its own power due to overheat or the like. That is, there is a problem in the conventional front structure 40 of the vehicle that, even in the event of a minor collision, the front right side millimeter-wave radar 401a or the front left side millimeter-wave radar 401b is moved back, ending up with damaging other parts, thereby impairing the damageability of the vehicle.

Also, in the conventional front structure 40 of the vehicle as shown in FIG. 4, the front right side millimeter-wave radar 401a and the front left side millimeter-wave radar 401b are arranged to the front side of an engine, which needs to be cooled by intake air, and the auxiliary component, such as a condenser. Further, in order to reduce damage to the millimeter-wave radar caused by flying stones, or to provide more appealing appearance, a cover needs to be provided. Because of this, the opening area for intake air cooling is reduced, thereby impairing the cooling performance. Moreover, in order to secure the detection performance of the millimeter-wave radar, the cover needs to be formed in a flat shape.

Still further, in the conventional front structure 40 of the vehicle, a fixing location where the accuracy required for the millimeter-wave radar can be secured is limited, and the millimeter-wave radar needs to be fixed to a bumper reinforcement or the like via a rigid bracket having a complex structure so that deviation of the axis of the millimeter-wave radar or the like does not occur. Because of this, there also is a problem, such as increased weight and increased cost.

The present invention is made to solve the problems described above, and is intended to provide a front structure, of a vehicle, which prevents the reduction in cooling efficiency by use of intake air, and which suppresses damage caused to the auxiliary components, such as an air conditioning condenser, by the millimeter-wave radars on the left and the right sides in the event of collision.

In addition to this, the present invention is also intended to provide a front structure and a rear structure, of a vehicle, which allows reduction in weight gain of a vehicle, which is caused by a bracket holding a millimeter-wave radar.

Solution to the Problems

In order to solve the problems described above, the front structure of the vehicle according to the present invention includes the following components: a front right side radar for transmitting and receiving a radio wave to detect obstacles to a front right side of the vehicle; a front left side radar for transmitting and receiving a radio wave to detect obstacles to a front left side of the vehicle; a bumper reinforcement which is a reinforcing member for a bumper; a crash box at the left and a crash box at the right which are impact absorbing members each disposed between the bumper reinforcement and a body frame; and an auxiliary component disposed to the rearward of the front right side radar and the front left side radar, and cooled by intake air. The front right side radar is arranged to a side farther out than a right end of the auxiliary component, and the front left side radar is arranged to a side farther out than a left end of the auxiliary component.

In this configuration, even if the front right side radar and the front left side radar are moved back in the event of collision, the radars do not come in contact with the auxiliary components such as an air conditioning condenser, and thus a problem can be prevented that the front right side radar and the front left side radar damage the auxiliary components such as the condenser, causing liquid leakage and the like, thereby making it difficult for the vehicle to run on its own power.

In addition, since the front right side radar and the front left side radar are not arranged in front of the auxiliary components, an opening area for cooling is secured, and therefore the front right side radar and the front left side radar can be prevented from causing reduction in the performance of cooling the auxiliary components by use of intake air.

Also, the front right side radar of the front structure of the vehicle according to the present invention is arranged below the corresponding crash box connected to a right end side of the bumper reinforcement, and the front left side radar is arranged below the corresponding crash box connected to a left end side of the bumper reinforcement.

In this configuration, even if the front right side radar and the front left side radar are moved back in the event of collision, the radars do not come in contact with the auxiliary components such as the air conditioning condenser or the radiator, and thus a problem can be prevented that the front right side radar and the front left side radar damage the auxiliary components such as the condenser, causing liquid leakage and the like, which makes it difficult for the vehicle to run on its own power.

Further, the front right side radar and the front left side radar of the front structure of the vehicle according to the present invention are arranged at a predetermined distance or farther from a radiator hose provided in front of the auxiliary component.

In this configuration, a situation can be properly prevented, in the event of collision, that the front right side radar and the front left side radar are moved back, striking the radiator hose, thereby causing leakage of cooling water or the like.

Also, the auxiliary component of the front structure of the vehicle according to the present invention is a condenser or a radiator.

In this configuration, when the front right side radar and the front left side radar are moved back in the event of collision, the air conditioning condenser or the radiator, which is the auxiliary component, can be prevented from being damaged.

Further, the front structure of the vehicle according to the present invention includes the following components: a radar for transmitting and receiving a millimeter wave to detect obstacles; a bumper reinforcement which is a reinforcing member for a bumper; and a crash box at the left and a crash box at the right which are impact absorbing members each disposed between the bumper reinforcement and a body frame. The radar is arranged within the bumper reinforcement.

In this configuration, the radar is not required to be fixed via a bracket member, which is heavy and has a complex structure, and thus the weight reduction of the vehicle can be achieved. In addition, movement of the radar in the event of a minor collision of the vehicle is limited to within the bumper reinforcement, and therefore other auxiliary components can be prevented from being damaged when the radar is moved back.

Further, the radar of the front structure of the vehicle according to the present invention is fixed within the bumper reinforcement with bolts fastened from behind the bumper reinforcement, and an opening is formed in a front surface of the bumper reinforcement at a location, corresponding to a radio wave transmission and reception surface of the radar.

In this configuration, there is no metal surface, of the bumper reinforcement, in front of the transmission and reception surface of the radar, and therefore changes in the dielectric constant can be prevented, thereby allowing accurate measurement of distance from the vehicle to an obstacle, and detection of relative speed with respect to the obstacle.

Further, the radar of the front structure of the vehicle according to the present invention includes the following components: a front right side radar for detecting obstacles to a front right side of the vehicle; a front left side radar for detecting obstacles to a front left side of the vehicle; and a front radar for detecting obstacles in front of the vehicle. The front right side radar is arranged within and on a right end side of the bumper reinforcement, the front left side radar is arranged within and on a left end side of the bumper reinforcement, and the front radar is arranged within and at the center of the bumper reinforcement.

In this configuration, the front right side radar, the front left side radar, and the front radar can be arranged within the bumper reinforcement.

Further, the rear structure of the vehicle according to the present invention includes the following components: a radar for transmitting and receiving a millimeter wave to detect obstacles; a rear bumper reinforcement which is a reinforcing member for a bumper; and a crash box at the left and a crash box at the right which are impact absorbing members each disposed between the rear bumper reinforcement and a body frame. The radar is arranged within the rear bumper reinforcement.

In this configuration, the radar is not required to be fixed via a bracket member, which is heavy and has a complex structure, and thus the weight reduction of the vehicle can be achieved. In addition, movement of the radar in the event of a minor collision of the vehicle is limited to within the rear bumper reinforcement, and therefore other auxiliary components can be prevented from being damaged when the radar is moved back.

Further, the radar of the rear structure of the vehicle according to the present invention is fixed within the rear bumper reinforcement with bolts fastened from behind the rear bumper reinforcement, and an opening is formed in a front surface of the rear bumper reinforcement at a location, corresponding to a radio wave transmission and reception surface of the radar.

In this configuration, there is no metal surface, of the rear bumper reinforcement, in front of the transmission and reception surface of the radar, and therefore changes in the dielectric constant can be prevented, thereby allowing the accurate measurement of distance from the vehicle to an obstacle, and the detection of relative speed with respect to the obstacle.

Further, the radar of the rear structure of the vehicle according to the present invention includes the following components: a rear right radar for detecting obstacles to a rear right side of the vehicle; a rear left side radar for detecting obstacles to a rear left side of the vehicle; and a rear radar for detecting obstacles behind the vehicle. The rear right side radar is arranged within and on a right end side of the rear bumper reinforcement, the rear left side radar is arranged within and on a left end side of the rear bumper reinforcement, and the rear radar is arranged within and at the center of the rear bumper reinforcement.

In this configuration, the rear right side radar, the rear left side radar, and the rear radar can be arranged within the rear bumper reinforcement.

Advantageous Effects of the Invention

In a front structure and a rear structure of the vehicle according to the present invention, by arranging front left and front right side radars to sides farther out than left and right ends of the condenser, respectively, and below crash boxes connected to left and right end sides of the bumper reinforcement, respectively, damage to an auxiliary component, such as a condenser, can be properly prevented when the millimeter-wave radars are moved back in the event of collision.
In addition, the radars are not arranged in front of the condenser so as to prevent the reduction of performance of cooling the auxiliary component by use of intake air.

Further, because of the radars being arranged within the bumper reinforcement, a bracket structure for holding the millimeter-wave radars can be eliminated, and thus the weight reduction of the vehicle can be achieved.

Figure 1:
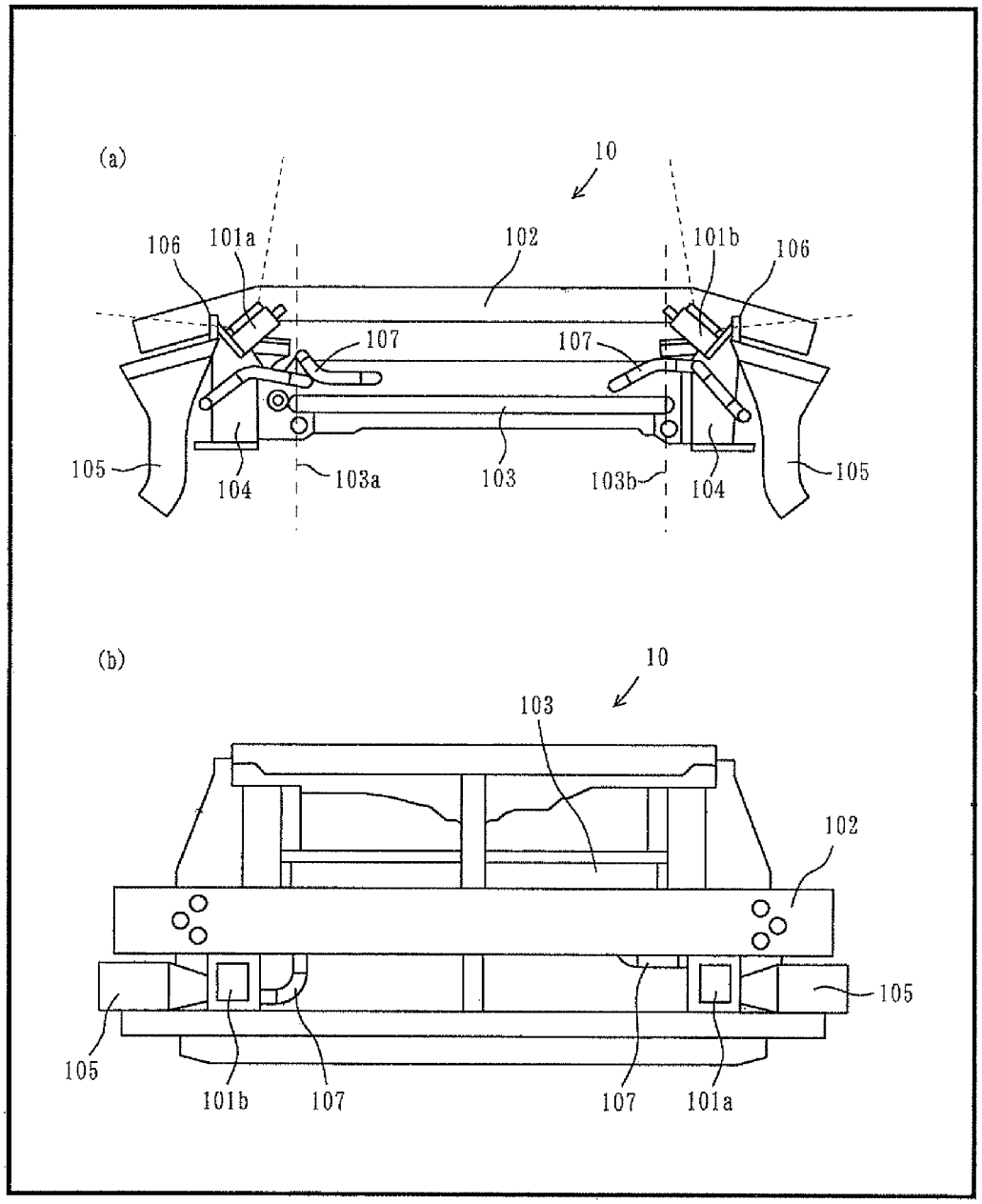
[FIG. 1] (a) of FIG. 1 is a diagram showing a bottom view of a front structure of a vehicle according to an embodiment 1, and (b) of FIG. 1 is a diagram showing a front view of the front structure of the vehicle according to the embodiment 1.

DESCRIPTION OF THE REFERENCE CHARACTERS 10, 20 front structure
30 rear structure
101a, 202 front right side millimeter-wave radar
101b, 204 front left side millimeter-wave radar
102, 201, 301 bumper reinforcement
103, 206 condenser
104, 205, 305 crash box
105 brake duct
106 bracket
107 radiator hose
203 front millimeter-wave radar
202a, 203a, 204a, 302a, 303a, 304a opening
302 rear right side millimeter-wave radar
303 rear millimeter-wave radar
304 rear left side millimeter-wave radar
306 lower back panel

BEST MODE FOR CARRYING OUT THE INVENTION

Hereinafter, a description is given of embodiments of a front structure and a rear structure of a vehicle according to the present invention, with reference to the accompanying drawings.

Embodiment 1

FIG. 1 shows an external view of a front structure 10 of the vehicle according to a present embodiment 1. (a) of FIG. 1 shows a bottom view of the front structure 10, and (b) of FIG. 1 shows a front view of the front structure 10.

The front structure 10 of the vehicle according to the present embodiment 1 includes a front right side millimeter-wave radar 101a, a front left side millimeter-wave radar 101b, a bumper reinforcement 102, a condenser 103, crash boxes 104, brake ducts 105, brackets 106, and radiator hoses 107.

Hereinafter, description is given of functions of the components 101 through 107 mentioned above.

The front right side millimeter-wave radar 101a and the front left side millimeter-wave radar 101b each have a distance measurement function and a speed measurement function. The distance measurement function measures the distance from the front right side millimeter-wave radar 101a and the front left side millimeter-wave radar 101b to an object, by calculating the distance from the front right side millimeter-wave radar 101a and the front left side millimeter-wave radar 101b to the object, based on calculation of the relationship between time from the transmission of a radar to its reception and speed of light. The speed measurement function measures a relative speed with respect to the obstacle. Regions shown by dotted lines in (a) of FIG. 1 each indicate a detection region of the radar.

Since high accuracy is required in detecting obstacles, the front right side millimeter-wave radar 101a and the front left side millimeter-wave radar 101b are each fixed to the bumper reinforcement 102, or the like, by using the bracket 106, which is rigid, so that deviation of the axis of each radar does not occur.

The bumper reinforcement 102 is a member reinforcing a bumper, and is installed between a body frame (not shown) and a bumper (not shown), to suppress impact on or vibration of the body frame.

The condenser 103 turns a high temperature and high pressure gaseous refrigerant, compressed by a car air conditioning compressor, into a cool liquid. Also, the condenser 103 is arranged in the vertical direction, for example, in front of the radiator, because the condenser 103 needs to be cooled by using intake air.

The crash boxes 104 are impact absorbing members disposed between the bumper reinforcement 102 and the body frame, and for absorbing the collision energy so that, in the event of collision at a low speed, damage is limited to deformation of merely these crash boxes 104. The crash boxes 104 are advantageous to reduce the damage to the body to improve safety, and the like.

The brake ducts 105 are ducts, which are made of aluminum and the like, and which are for suppressing a heat amount generated in a braking event, by causing intake air to flow from the front of the vehicle to brake calipers mounted on wheels. Braking uses, for example, hydraulic pistons to squeeze brake pads against the rotor from the left and the right thereof to control the motion of the vehicle, but friction caused by this elevates the temperature of the brake calipers. Therefore, it is necessary to blow intake air to the brake calipers, by using the brake ducts 105.

Each of the brackets 106 connects and fixes the corresponding front right side millimeter-wave radar 101a or front left side millimeter-wave radar 101b to the bumper reinforcement 102 or the like.

The radiator hoses 107 are rubber hoses which connect the radiator (cooling apparatus) with the engine. These radiator hoses 107 are used to flow cooling water into the radiator, thereby cooling the engine.

As shown in FIG. 1, in the front structure 10 of the vehicle according to the present embodiment 1, the front right side millimeter-wave radar 101a and the front left side millimeter-wave radar 101b are arranged to sides farther out than the left and right ends of the condenser 103, respectively, (the right and left ends of the condenser 103 correspond to dashed lines indicated by 103a and 103b, respectively, in FIG. 1), and are arranged below the crash boxes 104 connected to both end sides of the bumper reinforcement 102.

Further, the front right side millimeter-wave radar 101a and the front left side millimeter-wave radar 101b are arranged at a predetermined distance or farther from the radiator hoses 107.

Because of this, in the front structure 10 of the vehicle according to the present embodiment 1, even if the front right side millimeter-wave radar 101a and the front left side millimeter-wave radar 101b are moved back in the event of collision of the vehicle, damage to the auxiliary components, such as the condenser 103, or to pipes of the radiator hoses 107 or the like, can be prevented, thereby preventing the problem that the damage to the auxiliary components causes the liquid leakage or the like, which makes it difficult for the vehicle to run on its own power.

In addition, since the front right side millimeter-wave radar 101a and the front left side millimeter-wave radar 101b are not arranged in front of the condenser 103, the opening area for cooling is secured. Therefore, the performance of cooling the engine, the air conditioning condenser or the like, by using intake air, is not impaired. Further, it is not necessary to provide a cover, as a conventional front structure, to reduce damage to the front right side millimeter-wave radar 101a and the front left side millimeter-wave radar 101b caused by flying stones, or to provide more appealing appearance. Therefore, there is no reduction in the performance of cooling the auxiliary components, by using intake air.

Still further, in the front structure 10 of the vehicle according to the present invention, a situation can be prevented that the front right side millimeter-wave radar 101a and the front left side millimeter-wave radar 101b are moved back, in the event of collision, striking the radiator hoses 107, causing the cooling water to leak, thereby causing the engine to overheat in the end.

The cover of a front bumper, described above, needs to pass therethrough the radio waves which are transmitted to or received from the front right side millimeter-wave radar 101a and the front left side millimeter-wave radar 101b, and is therefore formed of a resin or the like which is a dielectric material having excellent transparency to the radio wave.

Embodiment 2

Hereinafter, description is given of a front structure and a rear structure of the vehicle according to an embodiment 2 of the present invention, with reference to the accompanying drawings.

Figure 2:
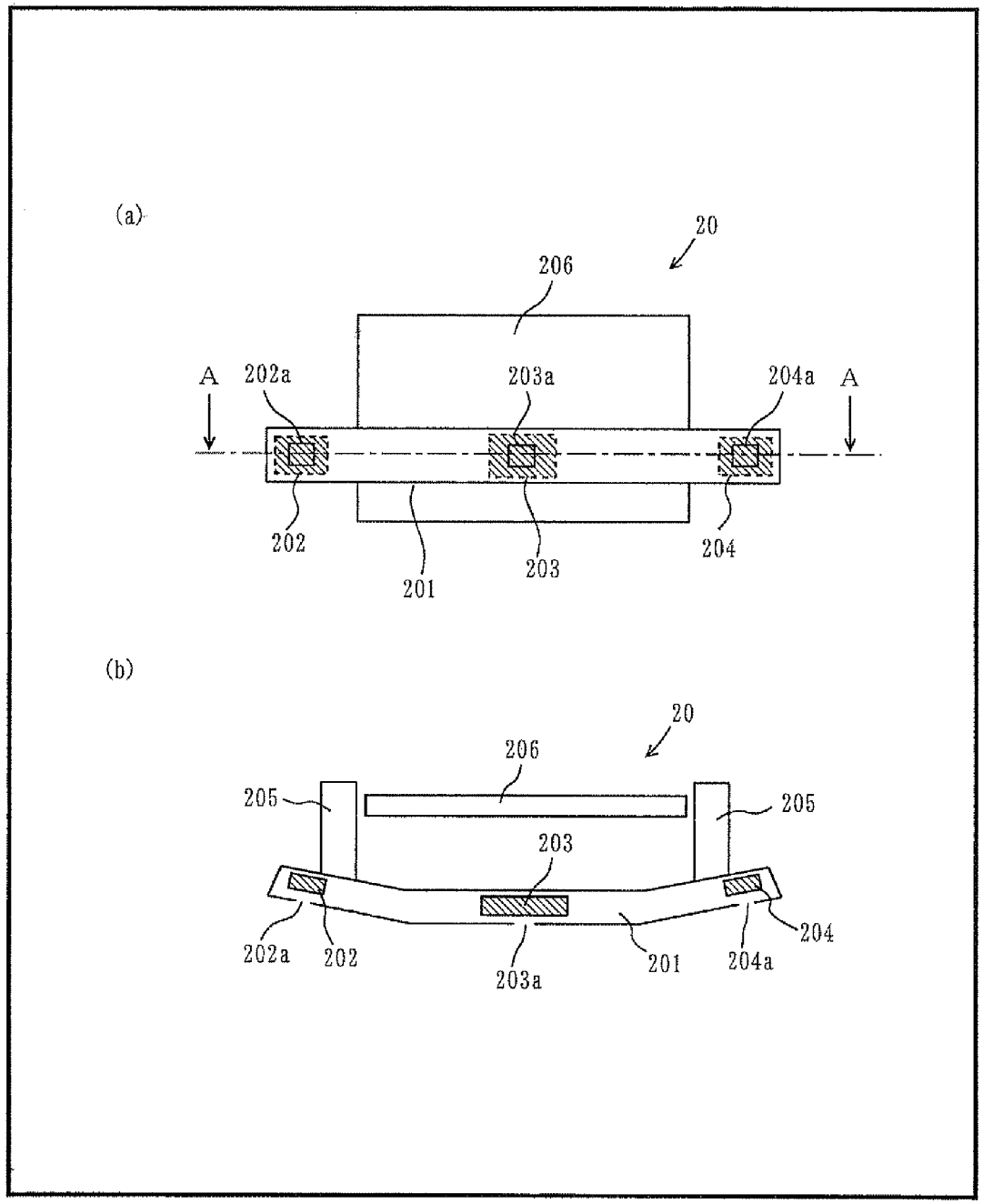
[FIG. 2] (a) of FIG. 2 is a diagram showing a front view of the front structure of the vehicle according to an embodiment 2, and (b) of FIG. 2 is a diagram showing a cross-sectional view, taken along a line A-A, of the front structure of the vehicle according to the embodiment 2.

FIG. 2 shows an external view of a front structure 20 of a vehicle according to the present embodiment 2. (a) of FIG. 2 shows a front view of the front structure 20, and (b) of FIG. 2 is a cross-sectional view, taken along a line A-A, of (a) of FIG. 2.

The front structure 20 of the vehicle according to the present embodiment 2 includes a bumper reinforcement 201, a front right side millimeter-wave radar 202, a front millimeter-wave radar 203, a front left side millimeter-wave radar 204, crash boxes 205, and a condenser 206. Functions of these components are the same as those of the embodiment 1, and therefore the description thereof is omitted.

In the front structure 20 of the vehicle, for example, the front right side millimeter-wave radar 202, the front millimeter-wave radar 203, and the front left side millimeter-wave radar 204 are fixed within the bumper reinforcement 201, whose vertical cross section has a polygonal shape (e.g., a substantially rectangular hollow shape), with bolts fastened from behind the bumper reinforcement 201.

Additionally, the openings 202a, 203a, and 204a are formed in the front surface of the bumper reinforcement 201 at locations, corresponding to radio wave transmission and reception surfaces of the front right side millimeter-wave radar 202, the front millimeter-wave radar 203, and the front left side millimeter-wave radar 204, respectively. These openings 202a through 204a each have, for example, the height of about 100 mm and the width of about 150 mm.

Figure 4:
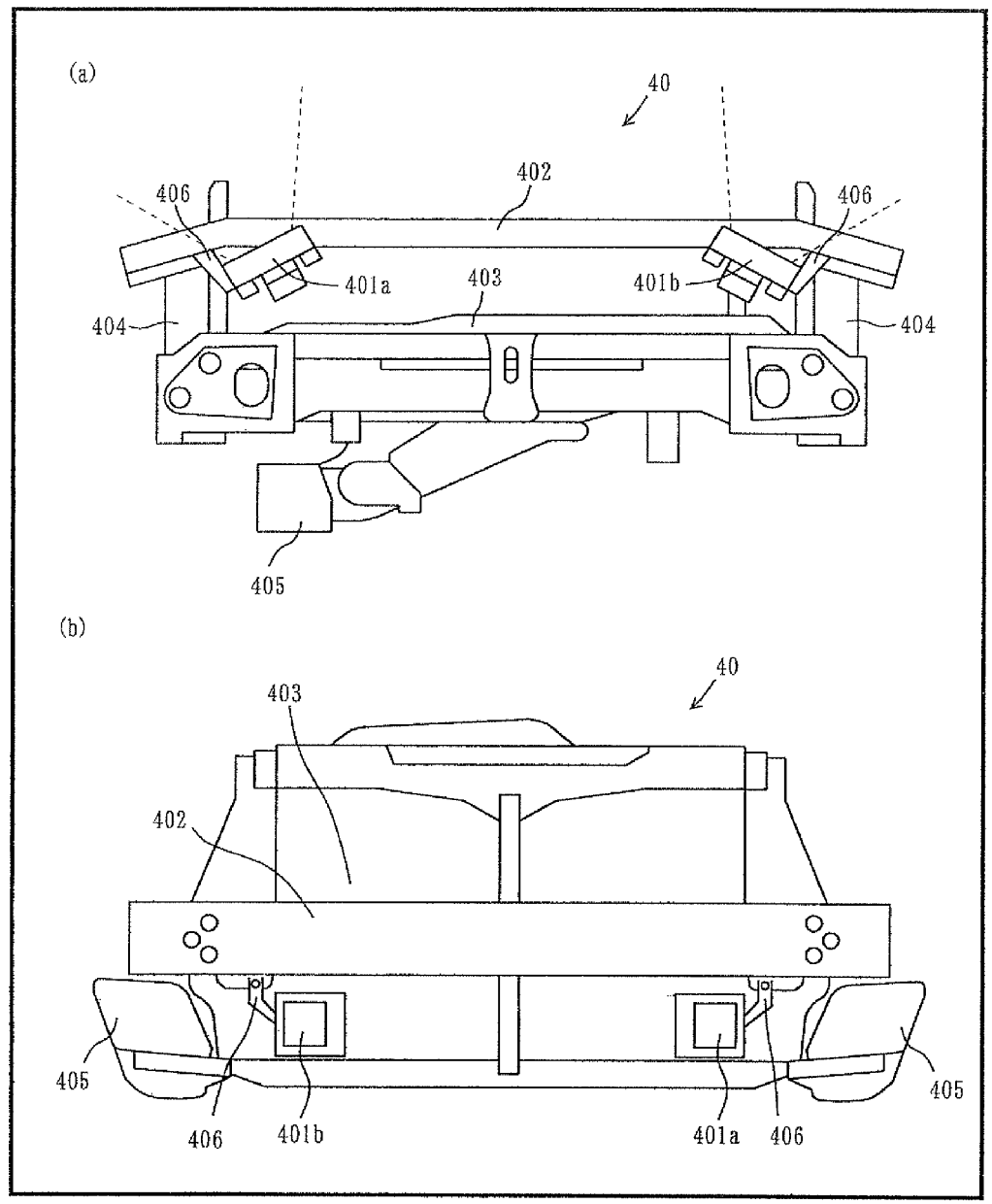
[FIG. 4] (a) of FIG. 4 is a diagram showing a bottom view of a conventional front structure of a vehicle, and (b) of FIG. 4 is a diagram showing a front view of the conventional front structure of the vehicle.

Accordingly, in the front structure 20 of the vehicle according to the present embodiment 2, arranging the front right side millimeter-wave radar 202, the front millimeter-wave radar 203, and the front left side millimeter-wave radar 204 within the bumper reinforcement 201 obviates the need for bracket members which are heavy and have a structure as complex as that of the conventional front structure shown in FIG. 4. Therefore, weight reduction of the vehicle can be achieved. Further, movements of the front right side millimeter-wave radar 202, the front millimeter-wave radar 203, and the front left side millimeter-wave radar 204, in the event of a minor collision of the vehicle, are limited to within the bumper reinforcement 201. Therefore, other auxiliary components can be prevented from being damaged when the front right side millimeter-wave radar 202, the front millimeter-wave radar 203, or the front left side millimeter-wave radar 204 is moved back.

Additionally, in the front structure 20 of the vehicle according to the present embodiment 2, the front right side millimeter-wave radar 202, the front millimeter-wave radar 203, and the front left side millimeter-wave radar 204 are not arranged in front of the condenser 206, and therefore there is no reduction in the performance of cooling the engine or the auxiliary component, by use of intake air. Further, the bumper reinforcement 201 can also serve as a protective cover for the front right side millimeter-wave radar 202, the front millimeter-wave radar 203, and the front left side millimeter-wave radar 204, and therefore there is no need for newly installing a cover.

Still further, providing the bumper reinforcement 201 with the openings 202a through 204a eliminates a metal surface from in front of the radio wave transmission and reception surfaces of the front right side millimeter-wave radar 202, the front millimeter-wave radar 203, and the front left side millimeter-wave radar 204. Therefore, transparency can be provided with respect to the radio wave, and changes in dielectric constant can be prevented, thereby allowing accurate measurement of distance, and detection of speed.

Figure 3:
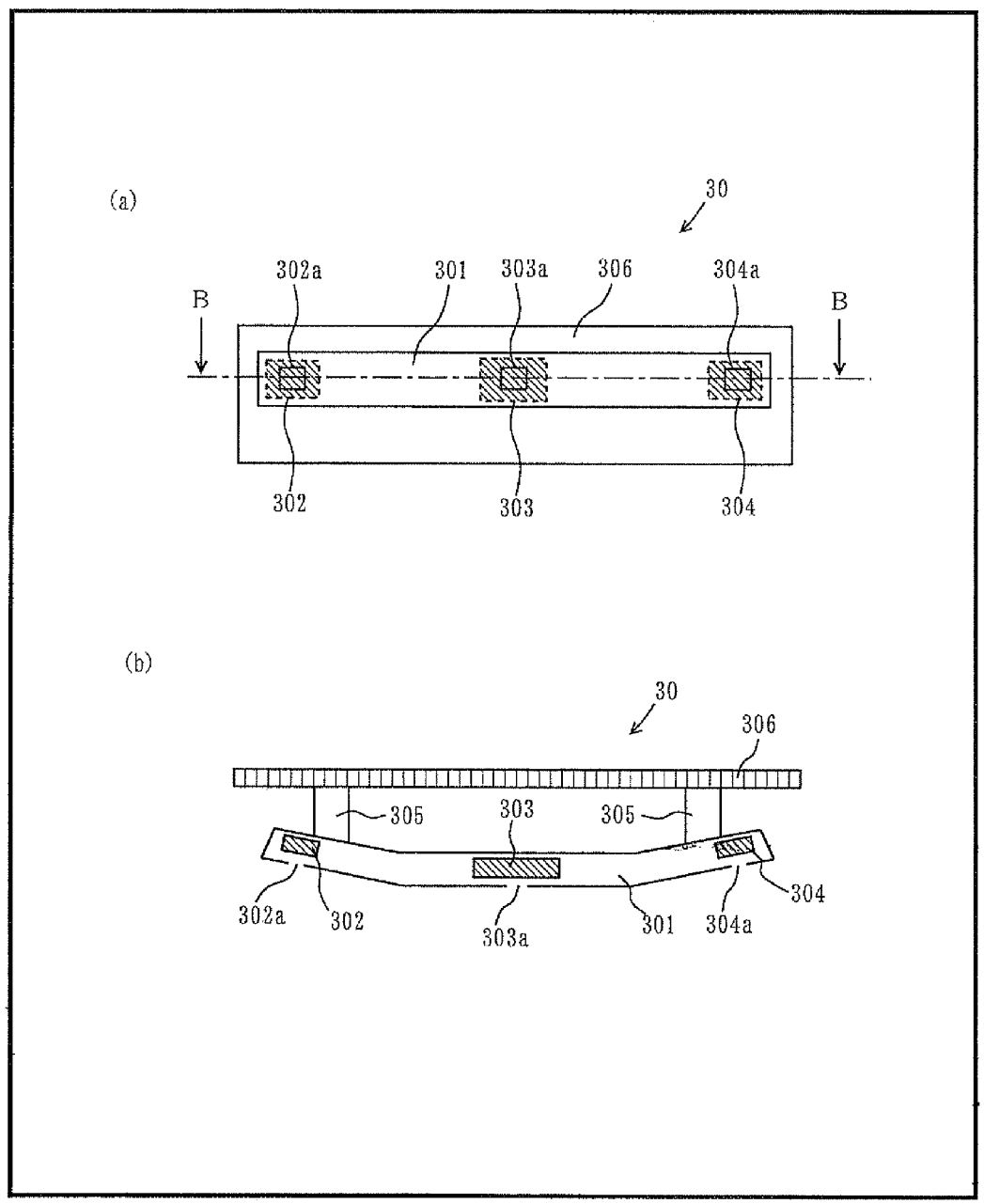
[FIG. 3] (a) of FIG. 3 is a diagram showing a front view of a rear structure of the vehicle according to the embodiment 2, and (b) of FIG. 3 is a diagram showing a cross-sectional view, taken along a line B-B, of the rear structure of the vehicle according to the embodiment 2.

FIG. 3 shows an external view of a rear structure 30 of the vehicle according to the present embodiment 2. (a) of FIG. 3 shows a front view of the rear structure 30 of the vehicle, and FIG. 3 (b) shows a cross sectional view, taken along a line B-B, of (a) of FIG. 3.

The rear structure 30 of the vehicle shown in FIG. 3 includes at least a rear bumper reinforcement 301, a rear left side millimeter-wave radar 302, a rear millimeter-wave radar 303, a rear right side millimeter-wave radar 304, crash boxes 305, and a lower back panel 306.

Even in the rear structure 30 of the vehicle shown in FIG. 3, the rear left side millimeter-wave radar 302, the rear millimeter-wave radar 303, and the rear right side millimeter-wave radar 304 are, as similar to the front structure 20 of FIG. 2 described above, fixed within the rear bumper reinforcement 301, whose vertical cross section has a polygonal shape, with bolts fastened from behind the rear bumper reinforcement 301. Additionally, openings 302a, 303a, and 304a are formed in the front surface of the rear bumper reinforcement 301 at locations, corresponding to radio wave transmission and reception surfaces of the rear left side millimeter-wave radar 302, the rear millimeter-wave radar 303, and the rear right side millimeter-wave radar 304, respectively.

Accordingly, in the rear structure 30 of the vehicle, arranging the rear left side millimeter-wave radar 302, the rear millimeter-wave radar 303, and the rear right side millimeter-wave radar 304 within the rear bumper reinforcement 301 obviates the need for bracket members. Therefore, weight reduction of the vehicle can be achieved.

Further, movements of the rear left side millimeter-wave radar 302, the rear millimeter-wave radar 303, and the rear right side millimeter-wave radar 304, in the event of collision, are limited to within the rear bumper reinforcement 301. Therefore, the lower back panel 306 and the like can be prevented from being damaged when the rear left side millimeter-wave radar 302, the rear millimeter-wave radar 303, or the rear right side millimeter-wave radar 304 is moved back.

Additionally, providing the rear bumper reinforcement 301 with the openings 302a through 304a eliminates a metal surface from in front of radar transmission and reception surfaces of the rear left side millimeter-wave radar 302, the rear millimeter-wave radar 303, and the rear right side millimeter-wave radar 304. Therefore, changes in the dielectric constant can be prevented, thereby allowing accurate measurement of distance, and detection of speed.

Although the description of each embodiment described above is given assuming that radars are millimeter-wave radars, the present invention is not limited thereto, and is applicable to other devices, such as laser radars, and ultrasonic wave sensors, which have functions to detect obstacles.

INDUSTRIAL APPLICABILITY

A front structure and a rear structure of a vehicle according to the present invention is applicable, for example, to moving objects, such as vehicles, which are equipped with a plurality of the radars for detecting obstacles to front left and front right sides or rear side of the moving objects.

The invention claimed is:

1. A front structure of a vehicle comprising:
a radar for transmitting and receiving a millimeter wave to detect at least obstacles in front of the vehicle;
a bumper reinforcement which is a reinforcing member for a bumper; and
a crash box at the left and a crash box at the right which are impact absorbing members each disposed between the bumper reinforcement and a body frame, wherein
the radar is arranged within the bumper reinforcement.

2. The front structure of the vehicle according to claim 1, wherein
the radar is fixed within the bumper reinforcement with bolts fastened from behind the bumper reinforcement, and
an opening is formed in a front surface of the bumper reinforcement at a location corresponding to a radio wave transmission and reception surface of the radar.

3. The front structure of the vehicle according to claim 1, wherein
the radar includes:
a front right side radar for detecting obstacles to a front right side of the vehicle;
a front left side radar for detecting obstacles to a front left side of the vehicle; and
a front radar for detecting obstacles in front of the vehicle, wherein
the front right side radar is arranged within and on a right end side of the bumper reinforcement,
the front left side radar is arranged within and on a left end side of the bumper reinforcement, and
the front radar is arranged within and at the center of the bumper reinforcement.

4. A rear structure of a vehicle comprising:
a radar for transmitting and receiving a millimeter wave to detect at least obstacles behind the vehicle;
a rear bumper reinforcement which is a reinforcing member for a bumper; and
a crash box at the left and a crash box at the right which are impact absorbing members each disposed between the rear bumper reinforcement and a body frame, wherein
the radar is arranged within the rear bumper reinforcement.

5. The rear structure of the vehicle according to claim 4, wherein
the radar is fixed within the rear bumper reinforcement with bolts fastened from behind the rear bumper reinforcement,
an opening is formed in a front surface of the rear bumper reinforcement at a location, corresponding to a radio wave transmission and reception surface of the radar.

6. The rear structure of the vehicle according to 4, wherein
the radar includes:
a rear right side radar for detecting obstacles to a rear right side of the vehicle;
a rear left side radar for detecting obstacles to a rear left side of the vehicle; and
a rear radar for detecting obstacles behind the vehicle, wherein
the rear right side radar is arranged within and on a right end side of the rear bumper reinforcement,
the rear left side radar is arranged within and on a left end side of the rear bumper reinforcement, and
the rear radar is arranged within and at the center of the rear bumper reinforcement,
the rear left side radar is arranged within and on a left end side of the rear bumper reinforcement, and
the rear radar is arranged within and at the center of the rear bumper reinforcement.

\* \* \* \* \*